United States Patent [19]
Todd

[11] 3,865,669
[45] Feb. 11, 1975

[54] EXPANSIBLE AND CONTRACTIBLE TRANSFER RING

[75] Inventor: Charles E. Todd, Detroit, Mich.

[73] Assignee: Uniroyal Inc., New York, N.Y.

[22] Filed: Jan. 8, 1973

[21] Appl. No.: 321,740

[52] U.S. Cl................. 156/394, 156/128, 156/133, 156/416
[51] Int. Cl........................................... B29h 17/02
[58] Field of Search............ 156/110, 123, 126–129, 156/131–133, 394, 398, 403, 405, 406, 414–420, 396

[56] References Cited
UNITED STATES PATENTS

| | | | |
|---|---|---|---|
| 2,971,562 | 2/1961 | Hollis................................ | 156/132 |
| 3,078,204 | 2/1963 | Appleby............................ | 156/132 |
| 3,151,013 | 9/1964 | Nebout............................. | 156/128 |
| 3,212,951 | 10/1965 | Porter.............................. | 156/126 |
| 3,364,093 | 1/1968 | Porter.............................. | 156/127 |
| 3,434,897 | 3/1969 | Caretta et al..................... | 156/403 |
| 3,442,746 | 5/1969 | Robertson......................... | 156/127 |
| 3,674,603 | 7/1972 | Leblond............................ | 156/394 |
| 3,676,262 | 7/1972 | Leblond............................ | 156/417 |
| 3,740,292 | 6/1973 | Leblond............................ | 156/127 |

*Primary Examiner*—Clifton B. Cosby
*Assistant Examiner*—John E. Kittle
*Attorney, Agent, or Firm*—Herbert A. Stern, Esq.

[57] ABSTRACT

An expansible and contractible transfer ring for conveying a breaker-tread assembly from a building drum in a tire building machine to a tire carcass mounted on a tire shaping mechanism spaced apart from the drum is disclosed. The transfer ring includes front and back support rings rigidly connected to one another, and a slip ring mounted between the front and back rings for relative rotation therebetween. A plurality of generally L-shaped levers or bell cranks are disposed in a circular arrangement about a central axis, one leg of each of the levers being coupled to the slip ring and the junction of the two legs of each of the levers being pivotally connected to the front and back support rings. The second leg of each of the levers is constrained to substantially radially inward and outward movements relative to the central axis in response to corresponding relative rotational movements between the slip ring and the front and back support rings. Each of said second legs has an inwardly directed surface for engagement with the outer surface of a tread face constituting a part of a breaker-tread assembly. Two power cylinders are interconnected between the front ring and the slip ring for rotating the latter relative to the front and back rings, and an adjustable control unit is coupled between the front ring and the slip ring for adjustably limiting the extent of the relative rotation and of the resultant substantially radial movements of the second legs of the levers.

13 Claims, 7 Drawing Figures

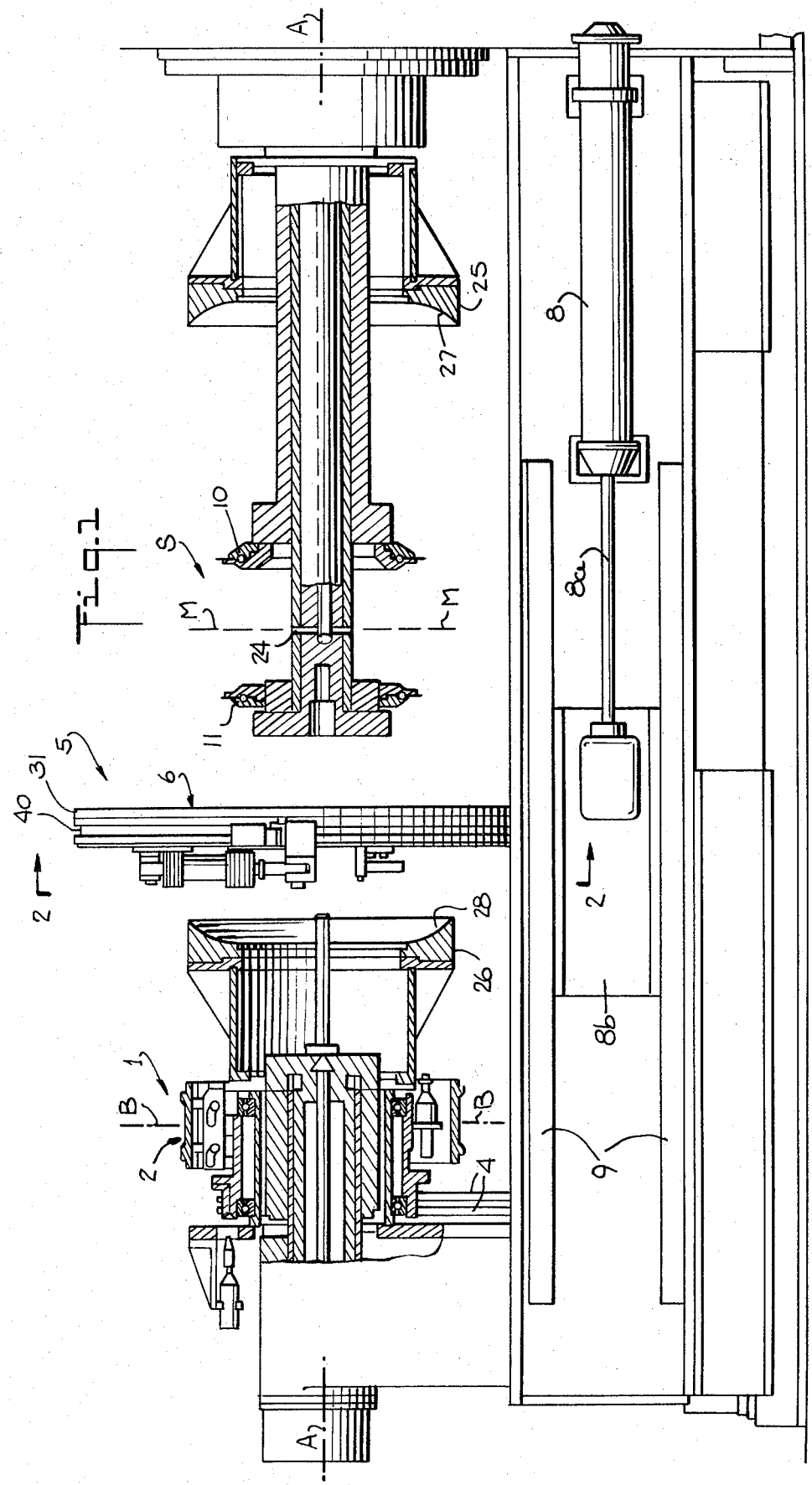

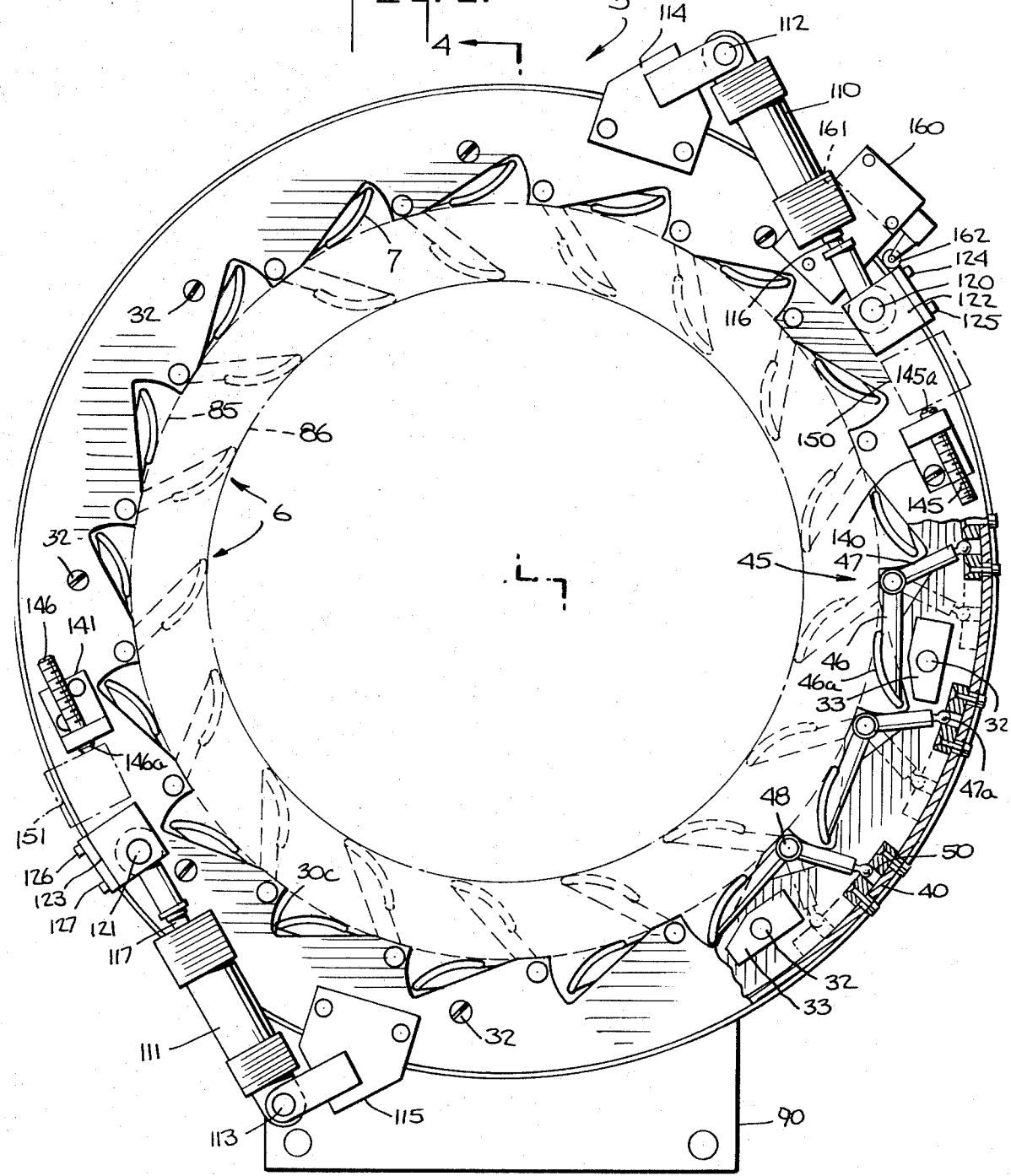

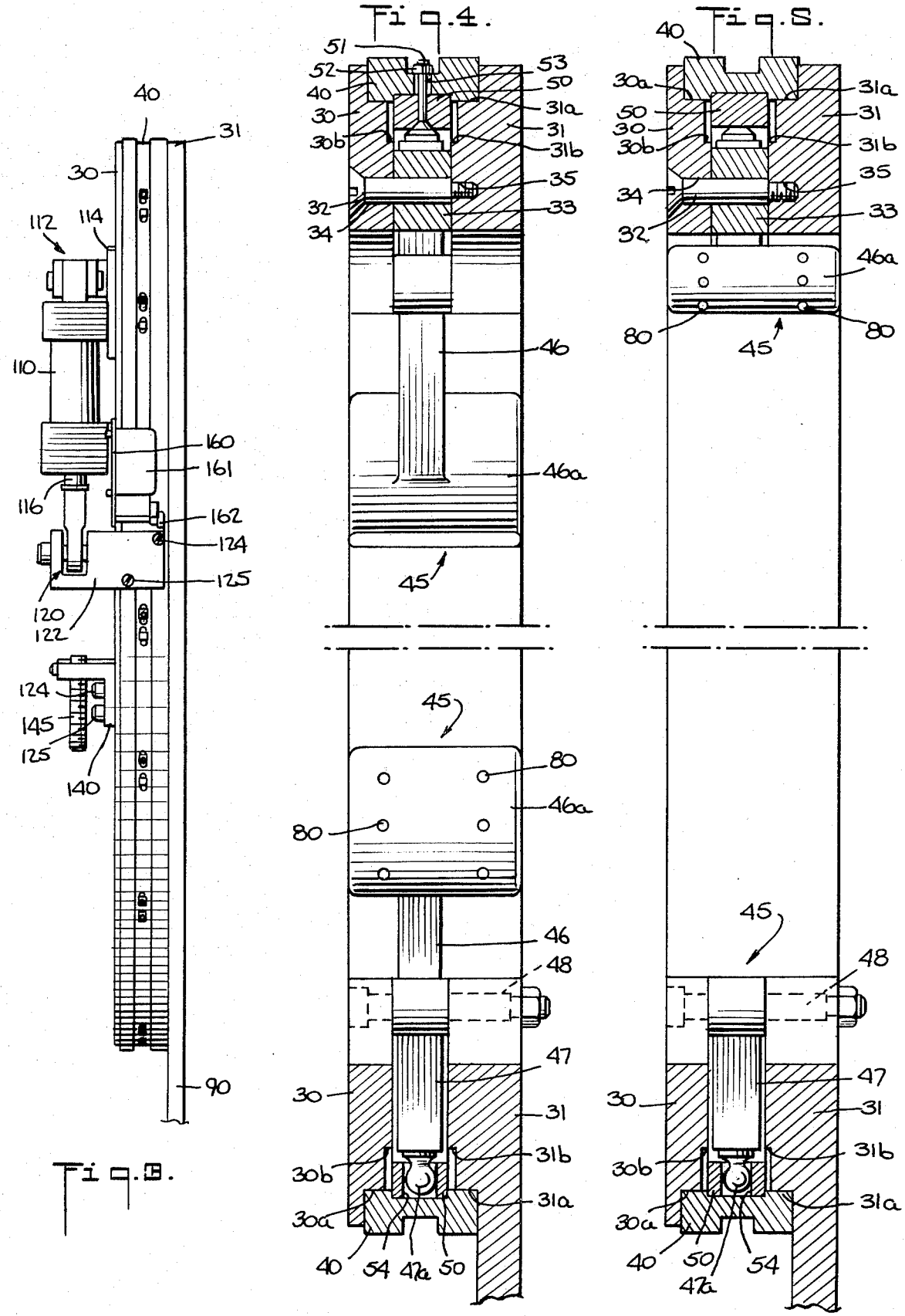

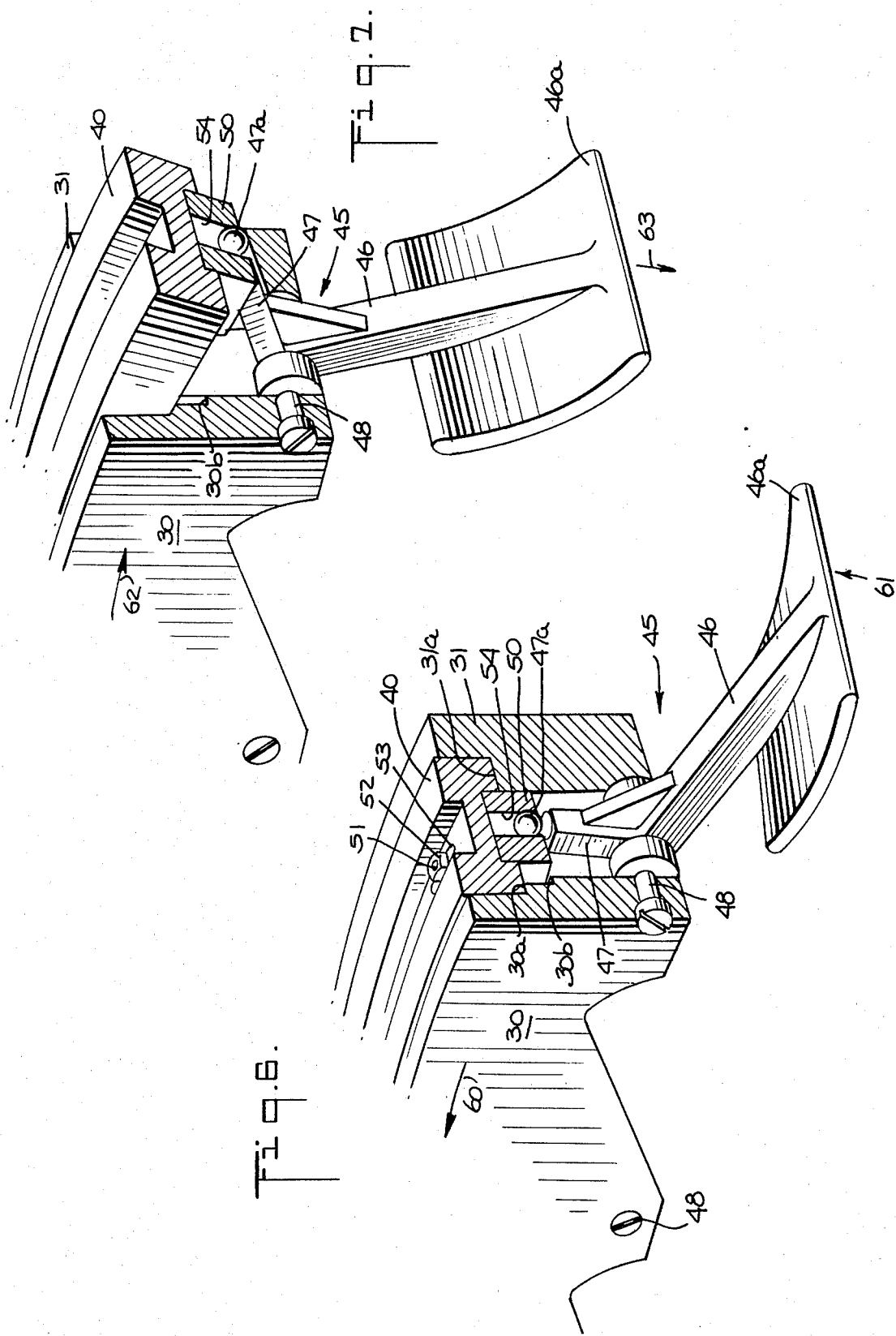

EXPANSIBLE AND CONTRACTIBLE TRANSFER RING

The foregoing abstract is neither intended to define the invention disclosed in this specification, nor is it intended to be limiting as to the scope of the invention in any way.

BACKGROUND OF THE INVENTION

This invention relates to tire building apparatus and more particularly to a transfer ring for conveying breaker-tread assemblies from a breaker-tread assembly building drum to a tire carcass mounted on a tire shaping drum.

In the building of tires having breakers or belts incorporated in the crown area of the tire, as in the case, for example of belted radial ply tires, a two stage process is conventionally employed. During the first stage of building, a cylindrical tire carcass is formed having one or more rubber covered cord plies anchored to an interconnecting axially spaced, parallel, co-axial bead cores, and a layer of rubber sidewall stock on each sidewall area of the carcass intermediate the eventual crown area thereof and the two bead areas thereof. Such a carcass is referred to herein as a "first stage" carcass. During the second stage of building, the shape of the first stage carcass is changed from a cylinder to a toroid, and one or more rubber covered cord breaker plies and a rubber tread slab are added to the crown portion of the tire carcass to form what is termed herein a "second stage" carcass. The term "rubber" as used herein is intended to cover natural and synthetic rubber and rubber-like materials as well as blends thereof. The term "cord" as used herein is intended to cover single and multiple strands, filaments, wires or cables of natural and/or synthetic textile materials such as cotton, rayon, nylon, polyester, glass fiber, and the like, metal, and/or such other materials as may be used as reinforcements in pneumatic vehicle tires.

As above stated, the shape of the first stage carcass is changed during the second stage of building from a cylinder to a toroid, and breaker plies and a rubber tread slab are added to the tire carcass to form the aforementioned second stage carcass. Machines of the type presently known in the art for building tires frequently utilize two stations to perform this function. The first station is utilized to fabricate the breaker-tread assembly by successively winding the various plies of each breaker and the tread slab about a radially expansible and contractible breaker building drum. A radially expansible and contractible and axially movable, transfer ring is then utilized to convey the breaker-tread assembly from the first station to the second station at which is positittioned the aforementioned cylindrical carcass, the second station including support and shaping disks and movable, conical, shaping rings engageable with the carcass sidewalls for shaping the first stage carcass into the second stage carcass during inflation thereof. The breaker-tread assembly is transferred from the outer surface of the breaker building drum to the inner surface of the radially expansible and contractible transfer ring, by bringing the ring, in its radially expanded condition, into a position surrounding the breaker-tread assembly and then radially contracting the ring into engagement with the assembly. Thereafter the breaker-tread assembly building drum is contracted to allow movement of the transfer ring, with the breaker-tread assembly contained therein, to a suitable position relative to the inflatable first stage carcass. This suitable position to which the transfer ring moves each breaker-tread assembly is a position encircling the eventual crown area of the first stage carcass which is positioned on the aforementioned support and shaping disks. The carcass is then inflated and the crown area thereof expands into pressurized contact with, and adheres to, the inner surface of the breaker-tread assembly in the transfer ring to form the desired second stage carcass. The transfer ring is then radially expanded, releasing the breaker-tread assembly, and moved axially away from the second stage carcass, allowing the carcass to be deflated and removed from the support and shaping disks.

Although tire making machines of the type presently known in the art are efficient and produce uniform, high quality, second stage carcasses, the transfer rings frequently used as components thereof, an example of such a representative transfer ring being disclosed in U.S. Pat. No. 3,674,603, are subject to the disadvantage that they are complex and utilize massive contracting segments. This results in transfer rings which are expensive to manufacture and require powerful and costly drive units for operation, the effect of which are expensive to manufacture and require powerful and costly drive units for operation, the effect of which is a tire making machine which is neither as efficient nor as economical as is desirable in the commercial construction of pneumatic vehicle tires. Applicant has determined that the construction and operation of the transfer ring can be significantly improved by utilizing relatively lightweight pivoted levers to form the expansible and contractible portion of the transfer ring and by simplifying the mechanism used to sychronously move all the levers when the ring is being radially expanded or contracted.

Accordingly, the primary object of the present invention is to provide an improved tire building apparatus.

Another object of this invention is to provide an improved tire building apparatus for precisely and uniformly conveying a breaker-tread assembly from a building drum in a tire building machine to a tire carcass mounted on a shaping mechanism.

Yet another object of this invention is to provide an improved breaker-tread assembly transfer ring in which relatively light-weight pivoted levers are utilized to form the expansible and contractible portion of the ring.

Further objects and advantages will become apparent as the following description proceeds.

Briefly stated, and in accordance with one embodiment of this invention, there is provided an expansible and contractible transfer ring for conveying a breaker-tread assembly from the building drum of a tire building machine to a tire carcass mounted on a shaping mechanism. The transfer ring includes a support means, slip ring means mounted on the support means for relative rotation therebetween, a plurality of breaker-tread assembly engaging elements or levers, each having first and second legs, diposed in a circular spaced sequence about a central axis, the first leg of each of the levers being coupled to the slip ring means and the junction of the first and second legs being pivotally connected to the support means, the second leg of each of the levers being constrained to substantially radially inward and outward movements relative to the central axis in response to corresponding relative rotational movements between the slip ring means and the support means and having respective radially inwardly directed surfaces for engagement with the outer surface of a tread constituting a part of a breaker-tread assembly, drive means interconnected between the support means and the slip means for effecting the relative rotation between the slip ring means and the support means, and adjustable control means coupled between the support means and the slip ring means for adjustably limiting the extent of the relative rotation and of the resultant substantially radial movements of the second legs of the levers.

While the specification concludes with claims particularly pointing out and distinctly claiming the subject matter regarded as the invention, it is believed that the invention will be better understood from the following description, taken in conjunction with the accompanying drawing, in which:

BRIEF DESCRIPTION OF THE DRAWINGS

FIG. 1 is a partially sectioned elevational view of a tire building machine including a breaker-tread assembly transfer ring embodying the present invention;

FIG. 2 is an enlarged, partially sectioned, front elevational view of the transfer ring taken along the line 2—2 in FIG. 1;

FIG. 3 is a side elevational view of the transfer ring;

FIGS. 4 and 5 are enlarged, partially sectional views taken along line 4—4 in FIG. 2 illustrating the transfer ring in its contracted and expanded conditions respectively; and FIGS. 6 and 7 are partially sectioned detailed perspective views of a portion of the transfer ring, illustrating a breaker-tread assembly engaging element in its expanded and contracted positions, respectively.

DESCRIPTION OF THE PREFERRED EMBODIMENT

Referring to FIG. 1, a tire building machine in accordance with one embodiment of this invention has been illustrated. The tire building machine generally comprises a radially expansible and contractible rotatable building drum, shown generally at 1, upon which, in the present example, breaker-tread assemblies employing metallic cord breakers are formed. The breaker ply structure to which the tread is ultimately applied is built up on a magnetized, outer surface 2 of the drum, which drum may be of the type shown in U.S. Pat. No. 3,676,262 to Jean Leblond. The magnetized outer surface of the drum serves to attract the metallic cords of the breaker to drum 1 to aid in holding the breaker properly on the drum. Suitable driving means (not shown) is provided for rotating the drum via suitable drive belts 4.

The machine further includes a transfer ring 5 for transferring or conveying the breaker-tread assembly formed on drum 1 in an axial direction from the drum to a tire carcass shaping mechanism, shown generally at S. The transfer ring 5 is provided with a plurality of radially movable breaker-tread assembly engaging elements which effectively form an expansible and contractible discontinuous ring, shown generally at 6 (FIG. 2), each element having an inwardly directed tread-engaging surface 7 preferably conforming to the contour of the outer surface of the tread in the breaker-tread assembly formed on building drum 1. The transfer ring 5 is arranged for axial movement along the base of the machine, in one direction from the position shown in FIG. 1 to a position in which it surrounds the building drum 1 in the median plane of symmetry B—B of the surface 2, and in the other direction from the FIG. 1 position to a position in the median plane of symmetry M—M of the shaping mechanism S. The means for moving the transfer ring includes a power cylinder 8, the piston rod 8a of which is connected to a sliding block 8b movable in a guide track 9 affixed to the machine base, the sliding block 8b being rigidly connected to, and serving as the support for, the transfer ring 5.

As will be described in greater detail hereinafter, suitable means is provided on transfer ring 5 for radially contracting discontinuous ring 6 into contact with the outer surface of a breaker-tread assembly on building drum 1. In building a tire, after discontinuous ring 6 is moved radially inward into contact with a breaker-tread assembly on the building drum 1, the drum is radially contracted to transfer sole control over the breaker-tread assembly to the transfer ring 5. Thereafter, the ring is axially shifted to the right, as viewed in FIG. 1, into vertical alignment with the median equatorial plane, indicated at M—M, of a first stage carcass (not shown) mounted on end plates or disks 10 and 11 which comprise the carcass supporting portion of the tire carcass shaping mechanism S.

The sidewall shaping portions of the tire shaping mechanism S, comprising conical shaping rings 25 and 26, are now moved toward the median equatorial plane of the tire M—M, into contact with the bead portions of the carcass which are sealingly engaged by the disks 10 and 11. At this time, the interior of the carcass on the disks 10 and 11 is inflated with fluid under pressure via conduit 24, and the shaping rings 25 and 26 and the disks 10 and 11 are axially moved closer to plane M—M to cause the first stage carcass to expand into contact with both the interior of the breaker-tread assembly, carried in transfer ring 5, and the conical interior surfaces 27 and 28 of the shaping rings 25 and 26 respectively. The conical configuration of the interior surfaces 27 and 28 of the shaping rings confines the expansion of the carcass to a symmetrically centered pattern with respect to the breaker-tread assembly and the beads of the carcass.

After the carcass has been expanded into contact with the breaker-tread assembly, the shaping rings 25 and 26 are moved axially away from the carcass, the discontinuous ring 6 of the transfer ring 5 is expanded radially outward to free it from contact with the tread portion of the breaker-tread assembly, the transfer ring 5 is shifted axially out of alignment with the median equatorial plane M—M of the tire to a point clear of the carcass, the carcass is stitched, the pressure in the carcass is relieved, and the disks 10 and 11 are moved closer together to break the adhesion of the carcass therewith. Thereafter, the carcass is removed from the machine and the machine is returned to the condition shown in FIG. 1, ready to be recycled for the building of a new breaker-tread assembly and for the application of ths new assembly to a new first stage carcass.

For a more detailed description of portions of the tire building machine illustrated in FIG. 1, excepting the transfer ring portion thereof, the reader is directed to U.S. Pat. No. 3,676,262 to Jean LeBlond. Since the details of such other portions of the machine form no part of the present invention, no further discussion of the remainder of the machine will be herein provided and this specification will continue with a detailed description of the improved transfer ring 5.

THE TRANSFER RING

Turning now to FIGS. 2 through 7, there is shown in detail the structural relationships between the various components comprising the transfer ring 5. Transfer ring 5 includes a front ring or member 30 formed with a pair of annular shoulders 30a and 30b (FIGS. 4 and 5), the ring 30 having a scalloped or saw-toothed inner periphery 30c (FIG. 2). A back ring or member 31 (FIGS. 4 and 5), formed with a pair of annular shoulders 31a and 31b, the ring 31 having a scalloped or saw-toothed inner periphery matching the contour of the inner periphery 30c of ring 30, is maintained in fixed spaced relationship with the ring 30. A plurality of spacers 33 (FIGS. 2, 4 and 5) are arranged between rings 30 and 31 in a circumferentially spaced sequence and the rings 30 and 31 are fixed relative to each other by screws 32 which extend through the spacers 33 and through a plurality of apertures 34 and 35 formed in rings 30 and 31 respectively, the apertures 35 being threaded for engagement with the threads of the screws 32. A cam ring or slip ring 40, having an H-shaped cross section, is positioned between the rings 30 and 31. The slip ring 40 rests on shoulders 30a and 31a and is thereby supported for rotation relative to the rings 30 and 31. A plurality of breakertread assembly engaging elements comprising generally L-shaped levers or bell cranks 45 are arranged in a circumferentially spaced sequence about a central axis and form the aforementioned discontinuous ring 6. Each L-shaped lever 45 has a pair of legs 46 and 47, a breaker-tread assembly gripping shoe 46a being formed at the free end of each leg 46 and a ball 47a being formed at the free end of each leg 47. Each of the levers 45 is pivotally mounted between the front ring 30 and the back ring 31 at the junction of legs 46 and 47 by a bolt or rod 48 which extends through the aligned crest portions of the inner peripheries of the rings 30 and 31. A plurality of slip ring mounting blocks 50 are each slidably connected by bolts 51 and nuts 52 to the radially inward central portion of the slip ring 40 (FIGS. 6 and 7) in an annularly spaced sequence. The bolts 51 extend through a plurality of elongated slots 53 formed in the slip ring 40 enabling the movement and adjustment of the blocks 50 along the periphery of the ring 40 for a reason which will be discussed below. Each of the slip ring blocks is formed with a recess 54 in which one of the balls 47a is retained.

Referring now particularly to FIGS. 6 and 7, it may be seen that as the slip ring 40 is moved in a counterclockwise direction relative to the rings 30 and 31, as indicated by arrow 60, the breaker-tread assembly gripping shoes 46a will move in a direction indicated by arrow 61, i.e., in the radially outward direction with respect to the central axis, thereby expanding transfer ring 5. The rotation of slip ring 40 in a clockwise direction relative to the rings 30 and 31, as indicated by arrow 62, will move the breaker-tread assembly gripping shoes 46a in a radially inward direction, as indicated by arrow 63, thereby contracting transfer ring 5 and enabling the shoes 46a to grip a breaker-tread assembly. As stated above, the slip ring blocks 50 are connected to the slip ring 40 by means of bolts 51 which extend through slots 53, the slots being formed in the central portion of the H-shaped cross section slip ring. This enables each of the blocks 50 to be independently moved along the inner periphery of ring 40 to a position at which the shoe 46a connected thereto is tangent to a common circle with the remaining shoes 46a. This insures that the breaker-tread assembly carried by the transfer ring 5 will be centrally supported therein and that there will be no distortion of the breaker-tread assembly due to one or more of the shoes 46a being out of adjustment relative to the remaining shoes.

As noted above, the rings 30 and 31 are formed with saw-toothed or scalloped inner peripheries. This scalloping of the inner peripheries allows the shoes 46a to be retracted radially outwardly of the circle formed by the aligned crests of the inner peripheries of rings 30 and 31. The shoes 46a thus rest in the bases of the inner peripheries of rings 30 and 31 when slip ring 40 is moved in a counterclockwise direction (as indicated by arrow 60 in FIG. 6) relative to the rings 30 and 31 to expand the discontinuous ring 6 to its maximum size.

FIGS. 4 and 5, which are partially sectioned elevation views of the transfer ring taken along the lines 4—4 of FIG. 2, illustrate the arcuate shoes 46a of two levers 45 in detail and show the relative positions on each shoe of six prongs 80. The prongs, which may be of a rigid material such as steel, extend radially from the inward side of each shoe 46a and enable the lever to securely grip a breaker-tread assembly upon contraction of the transfer ring and during conveyance of the assembly from the tire building drum to a first stage carcass. In particular, FIG. 4 illustrates the transfer ring in its contracted configuration, i.e., the shoes 46a being in their position illustrated in broken lines in FIG. 2, this "broken line" position corresponding to the completion of rotation of the slip ring 40 in the direction of arrow 62 (FIG. 7) relative to the rings 30 and 31. FIG. 5 illustrates the transfer ring in its expanded configuration, i.e., the shoes 46a being in their position illustrated in solid lines in FIG. 2, this "solid line" position corresponding to the completion of rotation of the slip ring 40 in the direction of arrow 60 (FIG. 6) relative to the rings 30 and 31.

Turning now to FIG. 2, there is illustrated a partially sectioned front elevational view of the transfer ring 5. Both the front ring 30 and the slip ring 40 are indicated in solid lines. The discontinuous ring 6, which is composed of the plurality of shoes 46a, is shown in its expanded configuration by broken lines 85 and in its contracted configuration by broken lines 86. The back ring 31 is hidden except for a flange 90 which extends downwardly from the bottom of the back ring 31 (FIGS. 2 and 3) and serves as the means by which the transfer ring 5 is fastened to and supported by the sliding block 8b (FIG. 1).

The expansible and contractible discontinuous ring 6 comprises the above mentioned plurality of breaker-tread assembly gripping shoes 46a, there being 17 such shoes shown, for purposes of example only, in the present embodiment. When the shoes 46a are moved radially inwardly to the positions illustrated by broken line 86, they form a discontinuous hollow cylinder, the axial cross sectional profile of the inner surface 7 of which preferably corresponds in shape to the outer surface of the breaker-tread assembly that is to be conveyed. Radial movement of the shoes 46a is limited by the structure of the transfer ring so far discussed to positions between the contracted position indicated by broken line 86 and the expanded position of the transfer ring 5 indicated by broken line 85. Additional structure is provided, however, for further limiting the radially inward or contracting movement of the shoes 46a and this additional structure, and the purpose thereof, will be discussed below. At the outer or expanded position of the shoes 46a, the inner diameter of the discontinuous ring 6 formed thereby is greater than the maximum outer diameter of a breaker-tread assembly formed on drum 1. With the shoes 46a in their outer position, transfer ring 5 may be freely moved axially from the position shown in FIG. 1 to a position in which its median plane is in alignment with the median plane of drum 1, there being clearance between the outer extremities of the breaker-tread assembly on the drum and the inner portion of the transfer ring.

Turning now to the means by which the transfer ring is radially actuated, FIG. 2 shows that the slip ring 40 is rotated relative to the front ring 30 by a pair of synchronously operated power cylinders 110 and 111, it being understood of course that any suitable drive means could be used in place of the illustrated cylinders. The cylinders 110 and 11 are pivotally connected by pivots 112 and 113 respectively, to brackets 114 and 115, respectively, the brackets 114 and 115 being fixedly attached to the front ring 30. The power cylinders 110 and 111 each have pistons, not shown, operatively associated therewith, which pistons are provided with piston rods 116 and 117, respectively, the piston rods extending out of the ends of the power cylinders remote from the brackets 114 and 115. The pistons rods 116 and 117 are respectively pivotally connected by pivots 120 and 121 to respective clevis brackets 122 and 123 which are affixed to the slip ring 40 by bolts 124–127 (FIG. 3). In this way the clevis brackets 122 and 123 provide the connections by which the cylinders 110 and 111 may effectively rotate the slip ring 40 relative to front ring 30 and back ring 31.

As previously discussed with respect to FIGS. 6 and 7, the clockwise rotation of the slip ring 40 relative to the rings 30 and 31 will urge the shoes 46a in a radially inward direction causing contraction of transfer ring 5 and enabling it to grip, with the aid of the prongs 80, a breaker-tread assembly. It will be understood of course that as the power cylinders 110 and 111 drive the respective clevis brackets 122 and 123 to the limits of travel determined by the maximum extension and retraction of the piston rods 116 and 117 respectively, the shoes 46a will move radially inwardly and outwardly, correspondingly contracting and expanding transfer ring 5 between the positions indicated in FIG. 2 by the broken lines 85 and 86. It is desirable, however, that the radially inward movement of the shoes 46a be controllable, i.e., that the radially most inward position of the shoes 46a be selectable to be between the positions indicated at 85 and 86 in FIG. 2. This would allow breaker-tread assemblies of differing diameters, corresponding to tires of various sizes, to be readily, and without costly modification, gripped and conveyed by the transfer ring.

To this end there is provided adjustable control means to adjustably limit the radially inward movement of the shoes 46a. The control means includes a pair of L-shaped brackets 140 and 141 (FIG. 2) connected to the front ring 30 by screws or any other suitable connecting means, the brackets 140 and 141 being associated with the power cylinders 110 and 111, respectively. One leg of each of the L-shaped brackets 140 and 141 extends perpendicularly outward from the front ring 30 and has a threaded aperture (not shown) formed therein. A screw 145 extends thrugh the aperture formed in the leg of bracket 140 and a screw 146 extends through the aperture formed in the leg of bracket 141. Screws 145 and 146 each have portions, designated 145a and 146a, respectively, which project an equal distance beyond the perpendicularly outward extending legs of their respective brackets 140 and 141 in the direction of their associated clevis brackets 122 and 123. When the cylinders 110 and 111 are actuated to cause the slip ring 40 to rotate in a clockwise direction relative to the rings 30 and 31, as viewed in FIG. 2, the clevis brackets 122 and 123 move toward the projecting portions 145a and 146a, respectively, of screws 145 and 146. When the brackets 122 and 123 reach the respective positions indicated by broken lines 150 and 151, abutting the projecting portions 145a and 146a, respectively, further rotation of the slip ring 40 will be prevented, thereby effectively preventing further contraction of transfer ring 5. By rotating the screws 145 and 146 to lengthen the portions 145a and 146a thereof, the potential rotational movement of the slip ring 40 may be limited by any desired amount. Accordingly, it will be seen that the lengthening of the portions 145a and 146a also limits the radially inward movement of the shoes 46a. This adjustability of the radially inner position of the shoes 46a gives a high degree of flexibility to the transfer ring in that it allows the transfer ring to be rapidly adjusted to accommodate different size tires, i.e., tires having breaker-tread assemblies of different diameters.

Means are also provided to indicate when the transfer ring is at its position of maximum expansion, i.e., when the position of the shoes 46a is that indicated by broken line 85 in FIG. 2. A bracket 160 (FIGS. 2 and 3) is attached to the front ring 30 by screws or any other suitable means and a limit switch 161 (FIG. 3) is connected to and supported by the bracket 160. The limit switch 161 is coupled to a suitable signal circuit (not shown) adapted to signal appropriate portions of the tire building machine that counterclockwise rotation of the slip ring 40, as seen in FIG. 2, has ceased, and that the transfer ring is in its expanded condition and may now be freely moved axially along the base of the machine. A roller contact 162 (FIGS. 2 and 3) is connected by any suitable means to the switch 161, and the retraction of the piston rod 116 by the power cylinder 110 causes clevis bracket 122 to contact and move the roller contact 162. The movement of roller contact 162 actuates the switch 161 thereby causing the transmission of an appropriate signal.

Suitable known electrical and fluid control circuits may be provided to initiate simultaneous operation of power cylinders 110 and 111 at proper times during operation of the machine shown in FIG. 1 to move the shoes 46a from their contracted position to their expanded position and vice versa. Such circuits would also control the operation of power cylinder 8 and would be operatively associated with control circuits of the remaining components of the machine.

From the foregoing description, it will be apparent that this invention provides an improved tire building apparatus for transferring or conveying breaker-tread assemblies from a building drum in a tire building machine to tire carcasses mounted on a shaping mechanism, the improved apparatus comprising a transfer ring which utilizes relatively light-weight pivoted levers to form the expansible and contractible portion of the transfer ring thereby simplifying the mechanism used to sychronously move all the levers when the ring is being radially expanded or contracted.

While a particular embodiment of this invention has been shown and described, it will be apparent to those skilled in the art that various changes and modifications may be made without departing from this invention in its broader aspects, and it is, therefore, the purpose of the appended claims to cover all such changes and modifications as fall within the true spirit and scope of this invention.

What is claimed is:

1. An expansible and contractible transfer ring for conveying a breaker-tread assembly from a building drum in a tire building machine to a tire carcass mounted on a tire shaping mechanism spaced apart from said drum, said transfer ring comprising;

a support means;

slip ring means having a central axis of rotation mounted on said support means for relative rotation therebetween;

a plurality of slip ring mounting blocks;

a plurality of slide means, individually coupling respective ones of said mounting blocks to said slip ring means in a circumferentially spaced sequence about the radially inward surface thereof, for individually selecting the circumferential spacing between each of said blocks;

a plurality of levers, each having first and second legs, disposed in a circumferentially spaced sequence about said central axis;

the first leg of each of said levers coupled to one of said slip ring mounting blocks and the junction of said firt and second legs pivotally connected to said support means;

the second leg of each of said levers being constrained to generally radially inward and outward movements relative to said central axis in response to corresponding relative rotational movements between said slip ring means and said support means, the limits of the radially inward and outward movement of each one of said second legs relative to that of each of the other second legs being determined by the relative spacing between the mounting block coupled to the respective one first leg and the other mounting blocks, said second leg of each of said levers having an inwardly directed surface for engagement with the outer surface of a tread constituting a part of a breaker-tread assembly; and drive means interconnected between said support means and said slip ring means for effecting said relative rotation between said slip ring means and said support means.

2. An expansible and contractible transfer ring according to claim 1 further comprising adjustable control means coupled between said support means and said slip ring means for adjustably limiting the extent of said relative rotation in a first direction and thereby limiting the resultant substantially radial movements of said second legs of said levers.

3. An expansible and contractible transfer ring according to claim 1, wherein said support means comprises:

a front support ring;

a back support ring;

a plurality of spacing means postioned between said front and back rings in an annularly spaced sequence; and a plurality of connecting means, each extending through said front ring, said back ring and one of said spacing means for maintaining said front and back rings in fixed, spaced relationship.

4. An expansible and contractible transfer ring according to claim 3, wherein said slip ring means is mounted between said front and back support rings.

5. An expansible and contractible transfer ring according to claim 4, wherein said levers are substantially L-shaped.

6. An expansible and contractible transfer ring according to claim 5, wherein the junction of said first and second legs of each of said L-shaped levers is pivotally connected between said front and back support rings.

7. An expansible and contractible transfer ring according to claim 5, wherein said inwardly directed surface for engagement with the outer surface of a tread comprises:

a breaker-tread gripping shoe at the free end of the second leg of each of said levers; and a plurality of rigid prongs extending radially inwardly from each of said shoes adapted to securely grip said breaker-tread assembly.

8. An expansible and contractible transfer ring according to claim 2, wherein said adjustable control means comprises:

a first bracket connected to said slip ring means for rotation therewith;

said first bracket having a flange extending to one side of said support means;

a second bracket connected to said one side of said support means; and adjustable arresting means carried by said second bracket in alignment with said flange and adapted to be positioned at a selected point on said one side of said support means;

said arresting means adapted to prevent further rotation of said slip ring means in said first direction when said flange is moved into contact therewith.

9. An expansible and contractible transfer ring according to claim 8 wherein said second bracket has a threaded aperture formed therein and wherein said adjustable arresting means comprises a threaded screw extending through said aperture, said screw being adapted to be moved toward and away from said flange.

10. An expansible and contractible transfer ring according to claim 2, further comprising signal means responsive to maximum relative rotation of said slip ring means in a second direction opposite to said first direction, said signal means comprising:

switch means connected to one or the other of said support means and said slip ring means and adapted to transmit a signal in response to actuation thereof; and actuating means connected to the remaining one of said slip ring means and said support means, said actuating means being in alignment with said switch means and positioned to actuate the latter in response to maximum relative rotation between said slip ring means and said support means in said second direction.

11. An expansible and contractible transfer ring according to claim 1, wherein said drive means comprises:
- a power cylinder pivotally coupled to one or the other of said support means and said slip ring means;
- a piston maintained within said cylinder; and
- a piston rod connected to said piston pivotally coupled to the remaining one of said support means and said slip ring means.

12. An expansible and contractible transfer ring for conveying a breaker-tread assembly from a building drum in a tire building machine to a tire carcass mounted on a tire shaping mechanism spaced apart from said drum, said transfer ring comprising:
- support means;
- slip ring means having a central axis of rotation carried on said support means for relative movement therebetween;
- a plurality of breaker-tread assembly gripping shoes positioned within said support means;
- a plurality of bell crank means pivotally mounted on said support means at spaced locations about said central axis, each of said bell crank means being individually annularly adjustably coupled to said slip ring means and interconnecting said slip ring means and one of said gripping shoes to move the latter generally radially between an expanded position and a contracted tread-engaging position in response to said relative movement, said individual annular adjustability providing for individual control of the expanded and contracted positions of each of said shoes, and
- means for moving said slip ring means relative to said support means to thereby concurrently move said gripping shoes between said expanded and contracted positions 13. An expansible and contractible transfer ring for conveying a breaker-tread assembly from a building drum in a tire building machine to a tire carcass mounted on a tire shaping mechanism spaced apart from said drum, said transfer ring comprising:
- a front support ring having an annular shoulder formed thereon;
- a back support ring having an annular shoulder formed thereon;
- a plurality of connecting means, each extending between said front ring and said back ring for maintaining said front and back rings in fixed, spaced relationship;
- slip ring means having a central axis of rotation mounted on said annular shoulders for relative rotation therebetween;
- a plurality of levers, each having first and second legs, disposed in a circumferentially spaced sequence about said central axis;
- the first leg of each of said levers coupled to said slip ring means and the junction of said first and second legs pivotally connected to said support means;
- the second leg of each of said levers being constrained to generally radially inward and outward movements relative to said central axis in response to corresponding relative rotational movements between said slip ring means and said support means, said second leg of each of said levers having an inwardly directed surface for engagement with the outer surface of a tread constituting a part of a breaker-tread assembly; and
- drive means interconnected between said support means and said slip ring means for effecting said relative rotation between said slip ring means and said support means.

* * * * *